United States Patent
Gatet et al.

(10) Patent No.: US 11,623,509 B2
(45) Date of Patent: Apr. 11, 2023

(54) PIPE FOR A VEHICLE FUEL TANK SUITABLE FOR WELDING

(71) Applicant: Plastic Omnium Advanced Innovation and Research, Brussels (BE)

(72) Inventors: Aurelien Gatet, Gouvieux (FR); Camille Devillers, Elincourt Sainte Marguerite (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 632 days.

(21) Appl. No.: 16/613,316

(22) PCT Filed: Jun. 12, 2018

(86) PCT No.: PCT/EP2018/065500
§ 371 (c)(1),
(2) Date: Nov. 13, 2019

(87) PCT Pub. No.: WO2018/229049
PCT Pub. Date: Dec. 20, 2018

(65) Prior Publication Data
US 2021/0053438 A1    Feb. 25, 2021

(30) Foreign Application Priority Data
Jun. 16, 2017 (FR) .................................. 1755494

(51) Int. Cl.
*B60K 15/04* (2006.01)
*B29C 49/00* (2006.01)
(Continued)

(52) U.S. Cl.
CPC .......... *B60K 15/04* (2013.01); *B29C 49/0005* (2013.01); *B29C 49/20* (2013.01);
(Continued)

(58) Field of Classification Search
CPC .. B60K 15/04; B60K 2015/047; B60K 15/03; B60K 2015/03493; B60K 15/01;
(Continued)

(56) References Cited

U.S. PATENT DOCUMENTS 3,677,243 A * 7/1972 Nerz ................. A61M 25/0668
604/161
4,776,846 A * 10/1988 Wells ...................... B29C 48/12
604/161
(Continued)

FOREIGN PATENT DOCUMENTS

| DE | 102 14 900 A1 | 7/1997 |
| WO | WO 97/24219 A1 | 7/1997 |
| WO | WO 00/29773 A1 | 5/2000 |

OTHER PUBLICATIONS

International Search Report dated Aug. 16, 2018 in PCT/EP2018/065500 filed Jun. 12, 2018.

*Primary Examiner* — Kareen K Thomas
(74) *Attorney, Agent, or Firm* — Oblon, McClelland, Maier & Neustadt, L.L.P.

(57) ABSTRACT

This method for manufacturing a pipe (2) for a vehicle fuel tank involves—molding a wall, comprising an inner layer (6) made from ethylene vinyl alcohol (EVOH) and an outer layer (8) made from a polymer suitable for welding, in a mold comprising at least one female shoulder that creates at least one male shoulder on an outer surface of an end portion of the wall during molding, then—cutting off the end portion of the wall.

2 Claims, 2 Drawing Sheets

Figure 1:
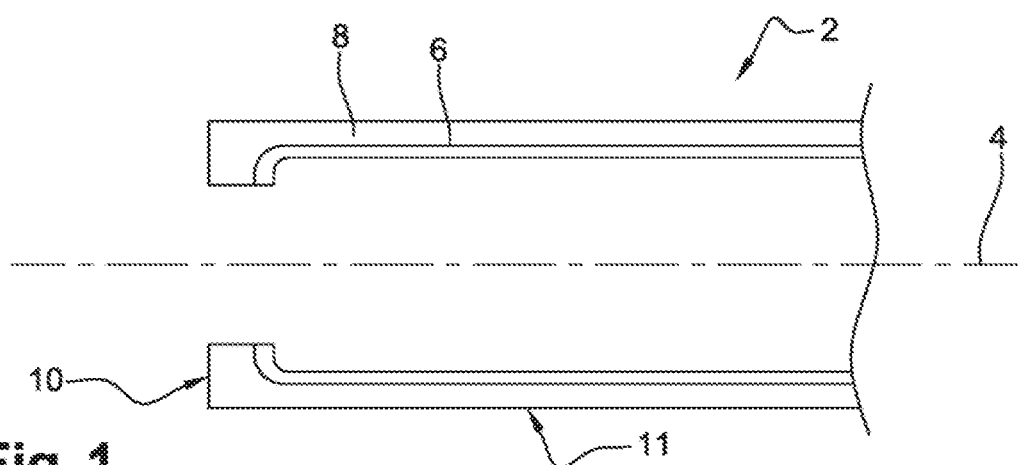

(51) Int. Cl.
*B29C 49/20* (2006.01)
*B29L 23/00* (2006.01)

(52) U.S. Cl.
CPC ... *B29C 2049/2047* (2013.01); *B29L 2023/22* (2013.01); *B60K 2015/047* (2013.01)

(58) Field of Classification Search
CPC ............... B29C 49/0005; B29C 49/20; B29C 2049/2047; B29C 57/10; B29L 2023/22; B32B 3/04; B32B 7/12; B32B 27/08; B32B 27/32; B32B 2250/246; B32B 2307/7242; B32B 2307/7265; B32B 2597/00; B32B 2605/00; B32B 1/08; B32B 27/306; F16L 9/133; F16L 9/22
See application file for complete search history.

(56) References Cited

U.S. PATENT DOCUMENTS

| | | | |
|---|---|---|---|
| 4,952,359 A * | 8/1990 | Wells | A61M 25/0009 264/150 |
| 5,069,856 A | 12/1991 | Holoubek et al. | |
| 5,980,808 A | 11/1999 | Imaizumi | |
| 6,170,535 B1 | 1/2001 | Sadr et al. | |
| 2004/0200846 A1* | 10/2004 | Miyajima | B60K 15/035 220/562 |
| 2006/0099365 A1* | 5/2006 | Sasai | B29C 66/112 428/36.9 |
| 2009/0126693 A1* | 5/2009 | Plissart | B60K 15/077 123/495 |
| 2013/0221001 A1 | 8/2013 | Yajima et al. | |
| 2019/0061517 A1* | 2/2019 | Hagano | B60K 15/04 |

* cited by examiner

PIPE FOR A VEHICLE FUEL TANK SUITABLE FOR WELDING

The invention relates to vehicle fuel tanks. More particularly, the invention relates to a pipe for a vehicle fuel tank, the pipe being suitable for welding.

A vehicle fuel storage system generally comprises a tank in which the fuel is stored. Numerous accessories or elements fulfilling different functions are fixed to said tank. Welding is one fixing method that is often selected for this purpose. One of the elements fixed by welding is in particular the pipe for supplying the tank with fuel.

It is known to provide a wall of the pipe with a barrier layer, on the inside of the pipe, the function of which layer is to make the pipe less permeable. This makes it possible to reduce the risk of leakage of the fuel or gas flowing in the pipe. A material generally selected for said layer is ethylene vinyl alcohol (EVOH). However, the properties of said polymer are not compatible with welding to the tank. This is why the wall of the pipe is generally multi-layered and comprises a barrier layer and a polymer layer suitable for welding.

There are several solutions for creating an interface having an area sufficient for welding and for achieving, on the pipe, a sufficient thickness of polymer suitable for welding.

A first solution involves directly mounting a part, such as a flange, on the end portion of the pipe to be welded to the tank. The flange increases the area at the pipe/tank interface, and the flange can be made of a polymer suitable for welding. However, installing said flange results in extra cost and an additional step in the fixing method, meaning that it is preferable not to use this solution.

A second solution involves axially compressing part of the pipe during the molding thereof. In this way, a localized bulge is created on part of the pipe. If said bulge is located at the end of the pipe, the arrangement of the layers of the wall of the pipe allows a thickness of polymer suitable for welding to be formed in the main direction of the pipe. In other words, the EVOH is spaced apart from the axial end of the pipe. It is thus possible to weld the end of the pipe to the tank. However, creating the bulge requires the pipe to move during the molding thereof. This process can be critical and is not necessarily controllable, which hinders the replicability of the manufacture of the pipe. Furthermore, said movement constitutes an additional process in the fixing method, which makes said method more complex.

Moreover, these two solutions both have the additional drawback of a localized increase in the diameter of the pipe. Depending on the shape and dimensions of the fuel tank, this may be a restriction. It may therefore be preferable to avoid adding bulk to the pipe.

The aim of the invention is to remedy the drawbacks outlined above and to propose a compact pipe that is suitable for welding and simple to produce.

To this end, the invention provides a method for manufacturing a pipe for a vehicle fuel tank, comprising:
  molding a wall, comprising an inner layer made of ethylene vinyl alcohol (EVOH) and an outer layer made of a polymer suitable for welding, in a mold comprising at least one female shoulder that creates at least one male shoulder on an outer surface of an end portion of the wall during molding, and then
  cutting off the end portion of the wall.

Thus, the end part of the pipe being cut off and the arrangement of the layers of the wall allow a thickness of polymer suitable for welding to be created in the main direction of the pipe, in a manner similar to the bulge in the prior art, in which the EVOH is spaced apart from the end of the pipe.

The step of cutting off the end portion makes it possible not to modify the general shape of the pipe while maintaining the suitability for welding imparted by the shape given to the pipe in the mold. Moreover, the male shoulder of the wall of the pipe is formed passively during molding. Thus, the method for manufacturing the pipe is not made more complex.

Furthermore, the step of moving the wall in the mold (to create the bulge as in the prior art), which diminishes the replicability of the manufacture of the pipe, is dispensed with.

Lastly, the shape of the female shoulder and the cutting step mean that the outer diameter of the pipe is not locally increased, in contrast with the two prior-art solutions outlined above. This drawback is thus also overcome.

According to a first embodiment of the invention, the cutting step takes place in parallel with a main axis of the pipe.

According to a second embodiment of the invention, the cutting step takes place at a non-zero angle in relation to a main axis of the pipe.

Preferably, the cutting step takes place at an angle of less than 60° in relation to the main axis, preferably less than 30°.

Thus, there are several conceivable cutting approaches. This makes the method for manufacturing the pipe more versatile and adaptable to existing manufacturing facilities. If the cutting step takes place at a non-zero angle in relation to a main axis of the pipe, it is preferable for said angle to be selected to be as small as possible to limit the reduction in the internal diameter of the pipe, which could have a negative impact on the filling performance of the pipe.

Advantageously, the female shoulder of the mold is formed by an, optionally detachable, insert.

A conventional mold can thus be readily upgraded to allow the male shoulder of the wall of the pipe to be formed. Making the insert detachable makes it possible to easily modify the shape of the female shoulder and thus to easily modify the shape and the dimensions of the male shoulder of the pipe.

Advantageously, the molding step is carried out by blow-molding the wall in the mold.

Blow molding is a controllable process that is suitable for the invention.

The invention also provides a method for manufacturing a vehicle fuel storage system, in which:
  a pipe is manufactured according to a method such as that outlined above, and
  the end of the pipe is welded to a fuel tank.

The invention also provides a pipe for a fuel tank, comprising a wall having an inner layer made of ethylene vinyl alcohol (EVOH) and an outer layer made of a polymer suitable for welding, an axial end portion of the pipe being formed of the polymer suitable for welding, the outer diameter of the pipe in the region of the end portion being less than or equal to the outer diameter of a center part of the pipe.

Advantageously, the outer diameter of the end portion is less than or equal to the outer diameter of a portion of the pipe adjoining the end portion.

This ensures that the outer diameter of the pipe is not locally increased at the location of the welding, which makes it possible to avoid redundant bulk.

Furthermore, the invention provides a mold for manufacturing a pipe for a vehicle fuel tank, comprising at least one female shoulder arranged so as to create at least one male shoulder on an outer surface of an end portion of a wall during the molding of said wall.

Advantageously, the female shoulder of the mold is formed by an, optionally detachable, insert.

Figure 2:
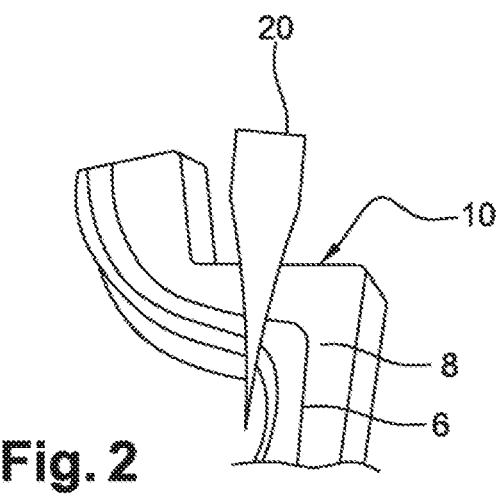
Figure 3:
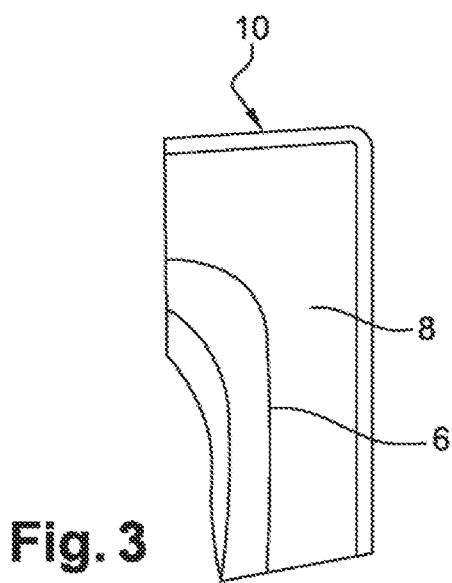
Figure 4:
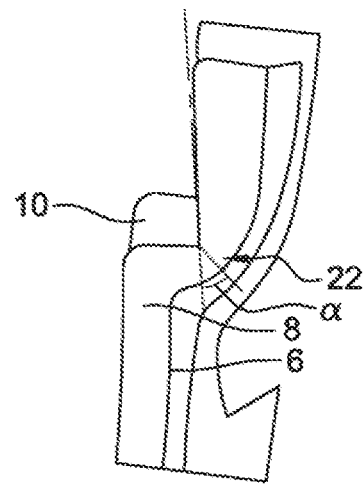
Figure 5:
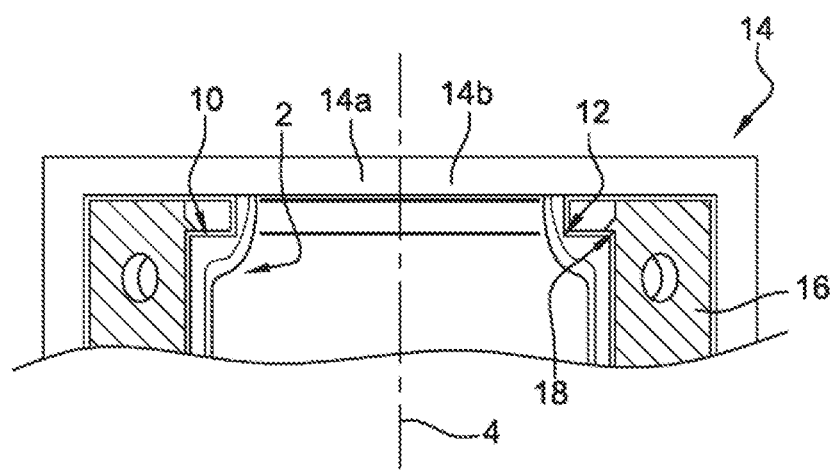
Figure 6:
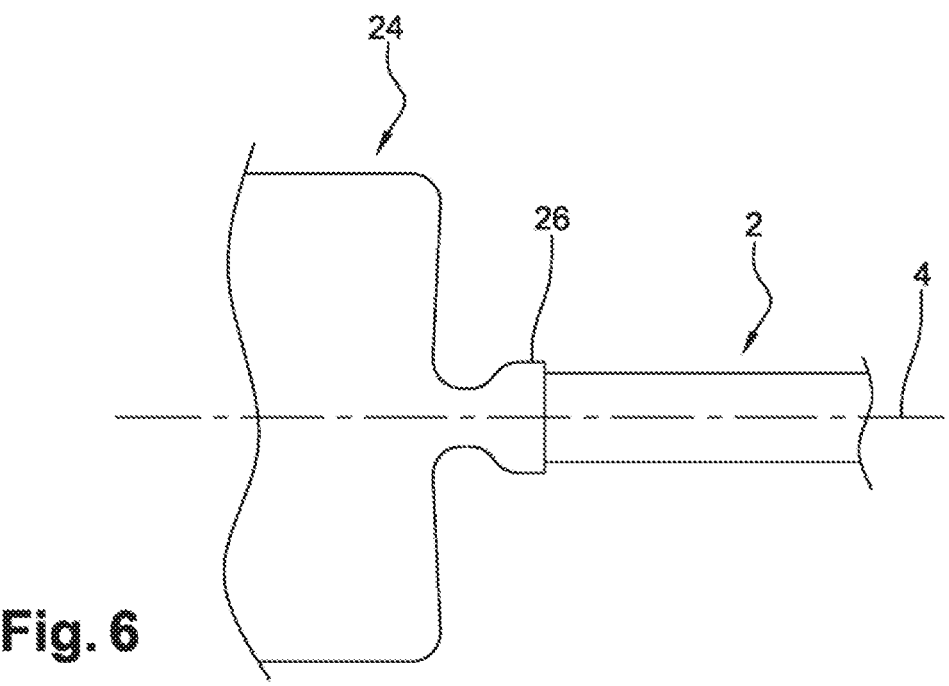
Figure 7:
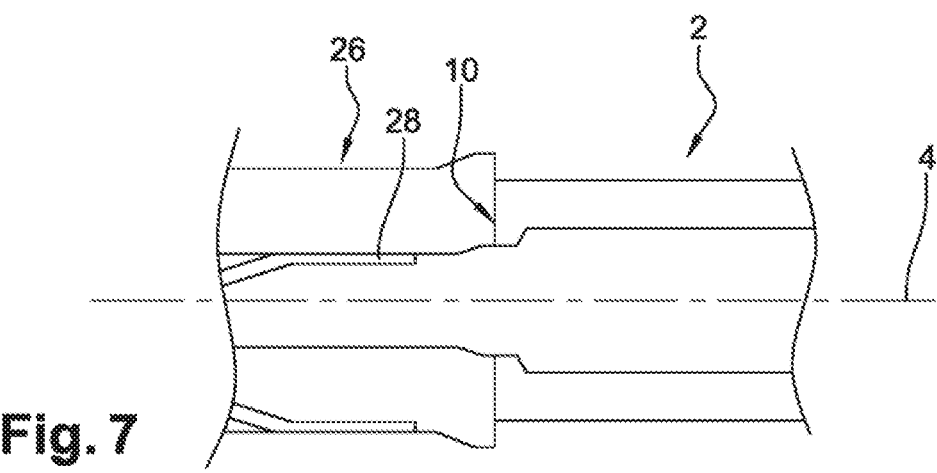

An embodiment of the invention will now be described with reference to the accompanying drawings, in which:

FIG. 1 is a longitudinal section of a pipe for a vehicle fuel tank according to a first embodiment of the invention, FIG. 2 shows a cutting step of a method for manufacturing the pipe in FIG. 1, FIG. 3 shows an end portion of the pipe in FIG. 1 following a cutting step, FIG. 4 shows an end portion of a pipe for a vehicle fuel tank according to a second embodiment of the invention, FIG. 5 is a schematic view showing a mold comprising a female shoulder, said mold being suitable for implementing a manufacturing method according to the invention, FIG. 6 is a schematic view showing the welding of the pipe in FIG. 1 to a fuel tank, and FIG. 7 is a sectional view of the welding of the pipe to the tank as shown in FIG. 6.

FIG. 1 shows a pipe 2 according to a first embodiment of the invention. The pipe 2 has a main axis 4. In the present case, the pipe 2 at least locally has a cylindrical shape, but the pipe may also have any other shape.

The pipe 2 comprises a wall having a plurality of layers. In the present case, said wall comprises an inner layer 6 and an outer layer 8, which radially overlap over a large part of the pipe 2.

The inner layer 6 is made of a "barrier" layer that allows the permeability of the pipe 2 to be reduced. In this case, said inner layer is made of ethylene vinyl alcohol (EVOH). However, a completely different barrier material having properties similar to those of EVOH could be selected.

The outer layer 8 is made of a polymer suitable for the later welding of the pipe 2 to a fuel tank. Polymers of this kind are well known to a person skilled in the art. Said polymer may be, for example, high-density polyethylene (HDPE).

The inner layer 6 is understood to mean the layer located radially below the outer layer 8. In other words, the inner layer 6 does not face the radially outer surface of the pipe 2. The inner layer 6 may be formed of a plurality of layers comprising different materials. For example, a wall structure having six or seven layers may be provided, said structure comprising, from the interior to the exterior of the pipe, a conductive layer of conductive HPDE, optionally an intermediate HDPE layer, an adhesive layer, an EVOH barrier layer, an adhesive layer, an intermediate layer and lastly a black HDPE decorative layer. In this case, the black HDPE decorative layer forms the outer layer, and the entirety of the five or six other layers forms the inner layer within the meaning of the invention. Part of the inner layer is thus made of EVOH.

In the following, the wall will be considered to comprise only two layers, i.e. the inner layer 6, made entirely of EVOH, and the outer layer 8, to make it easier to illustrate the invention.

The pipe 2 has an axial end 10 suitable for welding the pipe 2. The other end of the pipe 2 is not shown and will not be described because it is not necessary to describe said end for the invention to be understood. As can be seen in FIG. 1, the end portion 10 of the pipe is formed of the polymer suitable for welding. The pipe 2 can thus be readily welded in the region of said end 10 because EVOH, a material incompatible with welding, is not present in the end portion 10.

As can also be seen in FIG. 1, the outer diameter of the pipe 2 in the region of the end portion 10 is less than or equal to the outer diameter of a center part 11 of the pipe 2. In this case, the outer diameter of the end portion 10 is less than or equal to the outer diameter of a portion of the pipe adjoining the end portion 10. The inner layer 6 and the outer layer 8 radially overlap over the entirety of the center part 11 of the pipe 2. In this case, the outer diameter of the pipe 2 in the region of the end portion 10 is roughly equal to the diameter of the center part 11. The center part 11 of the pipe 2 is located outside of the two axial end portions of said pipe.

These properties of the pipe are valuable for reasons that will be described further on in the application.

A method for manufacturing the pipe according to a first embodiment will now be described.

With reference to FIG. 5, the wall comprising the EVOH layer and the polymer layer suitable for welding are firstly molded in a mold 14 that allows blow molding.

The mold 14 comprises two mold parts 14a and 14b, each having part of an insert 16. In the mold, said insert forms a female shoulder 18 arranged so as to create at least one male shoulder 12 on an outer surface of the end portion of the wall during molding. Once the molding is complete, the wall takes the form of the pipe 2.

After molding, the end portion 10 of the pipe 2 is cut off. As can be seen in FIG. 2, this cut is made in parallel with the axis 4, along the arrow 20. In this way, the part of the end portion 10 having the male shoulder 12 is taken away from the pipe 2. It is this cut that allows the remaining part of the end portion 10 of the pipe 2 to be formed, entirely, of the polymer suitable for welding. This can be seen at a larger scale in FIG. 3.

According to a second embodiment of the invention shown in FIG. 4, the end portion 10 is not cut off in parallel with the axis 4, but at a non-zero angle α in relation to the axis 4, along the cutting line 22. Said angle α is less than 60°; in FIG. 4, it is roughly 45°. However, it is preferable for said angle α to be less than 30°. In exactly the same way as the first embodiment, the remaining part of the end portion 10 of the pipe 2 is formed of the polymer suitable for welding.

FIG. 6 shows a fuel tank 24 that belongs to a vehicle fuel storage system according to the invention. Said storage system is manufactured according to the following method:

manufacturing the pipe 2 according to a method corresponding to the above, according to either of the two outlined embodiments, and then welding the end portion 10 of the pipe 2 to the tank 24.

Since the end portion 10 of the pipe 2 is formed of the polymer suitable for welding, it is possible to perform the weld directly without having to prepare the pipe 2 or the tank 24 for this purpose.

Furthermore, this allows the end portion 10 of the pipe 2 to maintain a shape similar to an identical filling pipe that does not comprise an EVOH layer, the end portion of said filling pipe not having to be adapted in any particular way and having a constant outer diameter.

Furthermore, the fact that the diameter of the wall of the pipe 2 in the region of the end portion 10 is less than or equal to the outer diameter of the center part 11 of the wall makes it possible to weld the pipe 2 in an opening or spout 26 provided on a wall of the tank 24. As can be seen in FIG. 7, the outer diameter of the pipe 2, which is constant or decreases towards the end 10, allows said pipe to conform to the shape of the spout 26. This also makes it possible not to hinder the functioning of an intake valve 28 located in the spout 26. Said valve 28 is commonly referred to as an "inlet check valve" (ICV).

Of course, it is also possible to modify the invention in many ways without going beyond the scope thereof.

The invention can also be applied to the welding of the pipe to a filler neck head. In practice, the second end of the pipe may be welded to a filler neck head of this kind. The embodiments of the invention outlined above can still be applied if the tank 24 and the spout 26 thereof are replaced with a filler neck head.

The invention claimed is:

1. A pipe for a vehicle fuel tank, comprising a wall having an inner layer made of ethylene vinyl alcohol (EVOH) and an outer layer made of a polymer suitable for welding, an axial end portion of the pipe being formed of the polymer suitable for welding so as to allow welding in a main direction of the pipe, the outer diameter of the pipe in the region of the end portion being less than or equal to the outer diameter of a center part of the pipe.

2. The pipe according to claim 1, wherein the outer diameter of the end portion is less than or equal to the outer diameter of a portion of the pipe adjoining the end portion.

* * * * *